(12) United States Patent
Lin et al.

(10) Patent No.: US 10,496,659 B2
(45) Date of Patent: Dec. 3, 2019

(54) DATABASE GROUPING SET QUERY

(71) Applicant: International Business Machines Corporation, Armonk, NY (US)

(72) Inventors: Fen-Ling Lin, San Jose, CA (US); Xin Ying Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 453 days.

(21) Appl. No.: 13/956,629

(22) Filed: Aug. 1, 2013

(65) Prior Publication Data

US 2014/0067794 A1 Mar. 6, 2014

(30) Foreign Application Priority Data

Aug. 31, 2012 (CN) .......................... 2012 1 0317328

(51) Int. Cl.
*G06F 17/30* (2006.01)
*G06F 16/248* (2019.01)

(52) U.S. Cl.
CPC .................................. *G06F 16/248* (2019.01)

(58) Field of Classification Search
CPC .................................................. G06F 17/30554
USPC ......................................................... 707/722
See application file for complete search history.

(56) References Cited

U.S. PATENT DOCUMENTS

| | | | |
|---|---|---|---|
| 6,594,651 B2 | 7/2003 | Kabra et al. | |
| 6,775,662 B1 | 8/2004 | Witkowski et al. | |
| 6,820,262 B1 | 11/2004 | Tellez et al. | |
| 2002/0198872 A1* | 12/2002 | MacNicol | G06F 16/24556 |
| 2005/0027690 A1* | 2/2005 | Zhang | G06F 16/24537 |
| 2005/0131879 A1* | 6/2005 | Ghosh | G06F 16/24532 |
| 2007/0022100 A1* | 1/2007 | Kitsuregawa | G06F 17/30433 |
| 2009/0007116 A1* | 1/2009 | Duffy | G06F 16/24532 |
| | | | 718/100 |
| 2009/0319487 A1 | 12/2009 | Carlin et al. | |
| 2011/0145220 A1 | 6/2011 | Kosuru et al. | |

FOREIGN PATENT DOCUMENTS

CN 101620600 A 1/2010

OTHER PUBLICATIONS

Harrison, Guy, "Oracle Parallel SQL", Quest Software, http://toadworld.com/Portals/0/GuyH/Articles/Oracle%20Parallel%20SQL%20Part%201.pdf, 12 pages.

(Continued)

*Primary Examiner* — Irete F Ehichioya
*Assistant Examiner* — Johnese T Johnson
(74) *Attorney, Agent, or Firm* — Cantor Colburn LLP; Richard Wilhelm

(57) ABSTRACT

Embodiments relate to a method, system, and computer program product for processing database grouping set query. The method includes receiving a grouping set query request; the grouping set query request including a plurality of groups and determining via said grouping set query request a plurality of to be assigned child tasks for parallel processing. Subsequently, one or more of the groups are assigned as child tasks to be parallel processed based on logical relationship among the groups and the number of available parallel child tasks determined and the parallel child tasks are executed to generate grouping set query result.

13 Claims, 6 Drawing Sheets

(56) References Cited

OTHER PUBLICATIONS

"Parallel Execution of QL Statements", Introduction to Parallel Execution of SQL Statements, http://www.mscd.edu/ittsdba/oradoc817/server.817/a76965/c22paral.htm, accessed Apr. 4, 2013, 42 pages.
"Parallel Processing", http://ss64.com/ora/syntax-parallel.html, accessed Apr. 4, 2013, 2 pages.

* cited by examiner

DATABASE GROUPING SET QUERY

PRIORITY

The present application claims priority to Chinese Patent Application number 201210317328.7 filed Aug. 31, 2012 and all benefits accruing therefrom under U.S.C. § 119, the contents of which is incorporated herein by reference in its entirety.

BACKGROUND

The present invention relates generally to database groupings, and more specifically to executing database grouping set queries.

Database management is important in todays computing environments. An important aspect of database management is handling queries. Grouping set query statements in many computer languages such as structured query language (SQL) are important aspect of database query groupings. These groupings can also include cube grouping queries and roll up grouping queries that are derived therefrom. Conventional query groupings extend to a plurality of dimensions and are widely applied in many data warehousing systems such as online analytical processing (OLAP) systems. Grouping set query statements have many applications, for example they may be used to define a plurality of groups in a same query. In addition, they can be further extended by using Group By statements.

A simple statement of grouping set query can be illustrated as Grouping Sets((C1, C2), (C1, C3)). In this example, (C1, C2) and (C1, C3) are two Groups respectively, and C1, C2, C3 are all names of data column in database table. Grouping set queries relates to a plurality of groups in some instances and in others can be further expanded to relate to various possible value combinations for a plurality of data columns. Executing these queries often consumes a large portion of the execution time.

Parallelism is widely applied in process of SQL statements to improve performance efficiency. For example, a piece of SQL statement may be divided into a plurality of child tasks, each of which task assigned to execute a part of total task (piece of SQL statement) simultaneously. Subsequently, all execution results of these child tasks are then merged to generate a final result. Therefore, a piece of a grouping set query statement may be processed in parallel in this manner by dividing the total task into child tasks. The challenge, however, is dividing the total task into a plurality of child tasks in a manner that the task is handled efficiently and quickly without consuming more time and duplication of work.

One approach may involve dividing a plurality of child tasks based on data in a way that grouping set query statements are executed in parallel. In the example above, the grouping set query statement Grouping Sets((C1, C2), (C1, C3)) is assumed to generate one million of rows of data that are somehow related. In processing this grouping set query statement, a decision is made to divide the task into four child tasks that can be processed in parallel. In this case, the one million of rows of data need to be equally divided (into fours) based on the total quantity of data to be processed. Each child task then needs to process 250,000 of rows of data. The problem, however, is that in addition to each child task processing 250,000 of rows of data, each child task also need to process a whole piece of grouping set query statement with respect to these 250,000 of rows of data. This will result in a need for merging process results relating to each child task performed in order to acquire the final execution result for the entire task. The merging process results in cases to a computation time that exceeds the original. This is because a large percentage and number of complex processes have to be duplicated by each child.

BRIEF SUMMARY

Embodiments include a method, system, and computer program product for processing database grouping set query. The method includes receiving a grouping set query request; the grouping set query request including a plurality of groups and determining via said grouping set query request a plurality of to be assigned child tasks for parallel processing. Subsequently, one or more of the groups are assigned as child tasks to be parallel processed based on logic relationship among the groups and the number of available parallel child tasks determined and the parallel child tasks are executed to generate grouping set query result.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
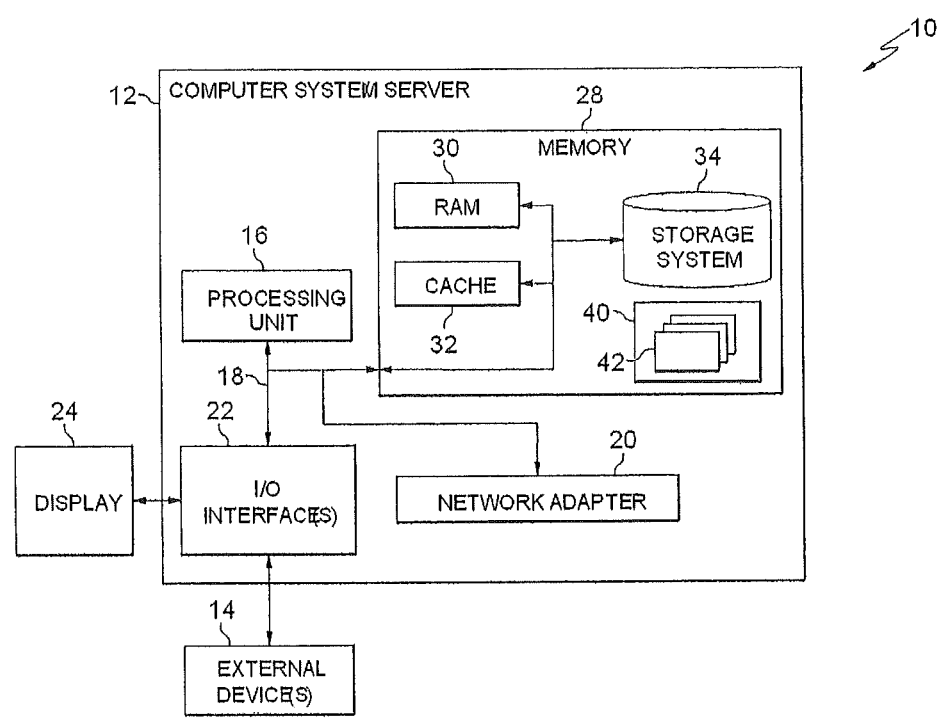
FIG. 1 depicts an exemplary computer system/server to be used with one embodiment.

Some embodiments will be described in more detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an exemplary computer system/server 12 is provided. In this embodiment the computer system/server 12 is only illustrative and not intended to suggest any limitation as to the scope of use or functionality of embodiments of the invention described herein.

The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having at least one or alternatively a set of program modules 42, may be stored in memory 28 by way of example. Each of the operating system(s), one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
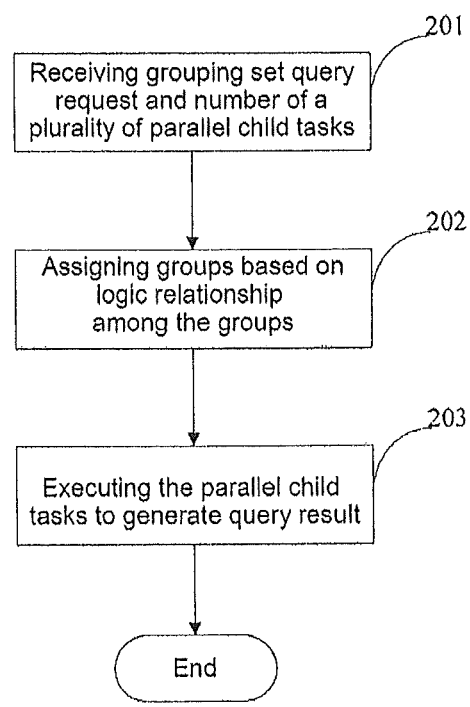
FIG. 2 is a flowchart illustration of a database grouping set query according to one embodiment.

FIG. 2 is a flow chart illustration of a method for database grouping set query according to an embodiment. The method as shown in FIG. 2 starts with step 201. At step 201, a grouping set query request and number of a plurality of parallel child tasks for processing the grouping set query request are received. The meaning and illustration as to grouping set query request have been described above. Simply, a grouping set query request comprises a plurality of grouping queries, each of which may be represented as a manner like (A, B) or Group By (A, B). Here, A and B represent data columns, and execution results of grouping query Group By (A, B) is obtained by querying data based on different possible value combination of data columns A and B, and sorting the querying results on basis of data columns A and B. Taking Table 1 (student information table) as an example, assuming that grouping query statement is Group By (Gender, Age), querying results are shown in Table 2 since two data columns of Gender and Age include two different possible value combinations.

TABLE 1

| No. | Gender | Age | Telephone |
|-----|--------|-----|-----------|
| 1 | F | 21 | 1234 |
| 2 | M | 22 | 5678 |
| 3 | M | 22 | 5678 |

TABLE 2

| No. | Gender | Age | Telephone |
|-----|--------|-----|-----------|
| 1 | F | 21 | 1234 |
| 2 | M | 22 | 5678 |
| 3 | M | 22 | 5678 |

The above tables provide examples of grouping query Groups. Grouping set query of these examples is a query request containing a plurality of grouping queries. For example, a grouping set query with respect to Table 1 is Grouping Set((Gender, Age), (No., Gender, Age), (Age, Telephone)), it contains 3 grouping querying requests. The detail description about querying results will be omitted for brevity. According to an embodiment of the present invention, grouping set query request is SQL (Structured Query Language) statement.

During parallel processing of an SQL statement, there is a plurality of parallelized child tasks, which can also be called as parallel child threads. Number of parallel child tasks is specified, for example, by SQL statement SET CURRENT DEGREE. Also, for example, number of parallel child tasks may be specified by a technology of dynamic assignment based on Core Workload. However, a determined number of parallel child tasks are received at step 201, it doesn't matter for the present invention which means is used to determine or specify number of parallel child tasks.

In step 202 of FIG. 2, one or more of the groups are assigned to at least one of the plurality of parallel child tasks based on logic relationship among the groups and the number of the plurality of parallel child tasks. Here, the logic relationship refers to logic relationship of a plurality of groups included in a grouping set query request between each other. Further, the logic relationship refers to a relationship capable of accelerating the speed of parallelized grouping sets query or equalizing parallelized child tasks loads possibly. Either accelerating the speed of parallelized grouping sets query or equalizing parallelized child tasks loads can attain a purpose of improving efficiency of grouping set query. The reason for assigning groups to the parallel child tasks based on logic relationship among the groups but not based on data amount is that in the case that the parallel child tasks are assigned with groups based on logic relationship among the groups, each of parallel child tasks executes the assigned groups with respect to all data records, such that it may be avoided that each of child tasks needs to perform very time-consuming merging process (including data de-duplication etc.) after it completes execution. For example, as for the above mentioned example, assuming that number of parallel child tasks is 2, then, according to the conventional approach in the art, first two pieces from three pieces of data records in Table 1 are assigned to child task 1, and the third piece of data record in Table 1 is assigned to child task 2, and child tasks 1 and 2 execute a whole piece of grouping set query statement with respect to the assigned data records during execution. The execution result of child task 1 is {(F, 21);(M,22)}, while that of child task 2 is {(M,22)}, thus it is seen that {(M,22)} needs to be de-duplicated in merging results of child tasks 1 and 2. However, according to a concept of the present invention, if the assignment of the child tasks is performed in a unit of group, it isn't needed to perform the above de-duplication process obviously. Those skilled in the art can appreciate that, only a simple example in Table 1 (only a group exists) is given above, which is only for simply describing the concept of the present invention. If grouping set query request contains a large number of groups, such technical effect will be more prominent and obvious that assignment of child tasks is performed in a unit of group according to the concept of the present invention.

In one embodiment, the logic relationship among the groups comprises a parent-child relationship. If part or all of data columns in a certain group are subset of data column in another group, it is considered that these two groups are in parent-child relationship. For example, group (Gender, Age) is subset of group (No., Gender, Age), thus group (Gender, Age) is in parent-child relationship with group (No., Gender, Age), and it is considered that group (Gender, Age) is child group while group (No., Gender, Age) is parent group. According to an embodiment of the present invention, if data columns of a group are total subset of data columns of another group, it is considered that these two groups are in parent-child relationship. The reason for assigning groups in grouping set query request to parallel child tasks based on parent-child relationship is that parallel child tasks may quickly execute parent groups depending on execution results of child groups. For example, assuming that group (Gender, Age) and group (No., Gender, Age) are assigned to child task 1, then once child task 1 completes execution of group (Gender, Age), the child task 1 may directly use execution result for group (Gender, Age) while executing group (No., Gender, Age) without scanning all data records again, which can improve efficiency of data query.

In another embodiment, the logic relationship among the groups refers to quantity relationship of possible value combination of the groups. Quantity of possible value combination is number of possible value combination of different data column values contained in specified groups, which are obtained based on history data statistics. The number of possible value combination is also referred as Gardinality. Taking Table 1 as an example, number of possible value combination of group (Gender, Age) is 2, while number of possible value combination of group (No., Gender, Age) is 3. It should be noted that, since data in database might be updated continually, number of possible value combination which are obtained based on history data statistic may not be entirely accurate. The reason for assigning groups in grouping set query request to parallel child tasks based on quantity relationship of possible value combination of groups is that if workloads of respective parallel child tasks are relatively in balance, it facilitate to improve the whole efficiency of grouping set query as well as avoid to wait for execute results of other child tasks which do not complete executions in a case that a plurality of child tasks have completed execution and are in a standby state.

Quantity relationship of possible value combination of the groups is entirely different from assignment of child tasks based on data in the prior art. The assignment of child tasks based on data in the prior art refers to assignment of total amount of data. For example, 1 million of pieces of data are stored in database and there are 4 parallel child tasks, and 1 million of pieces of total amount of data are divided by 4 and each parallel child task processes 250 thousands of pieces of data according to the prior art. The prior art uses such an approach of assignment based on total data amount regardless of any type of grouping set query request, and each of assigned child tasks still process all groups but process only part amount of data. However, in the present invention, quantity relationship of possible value combination of the groups is, as for each group and isn't relevant to total data amount, thus assignment based on quantity relationship of possible value combination of the groups in the present invention is in a unit of group (this group isn't as for total data amount), and each of assigned child tasks processes all amount of data but may process only (or preferentially process) part of groups.

According to yet another embodiment, the logic relationship among the groups comprises parent-child relationship among the groups and quantity relationship of possible value combination of the groups. According to the embodiment of the present invention, the two relationships may concurrently be used as logic relationship depending on which child tasks are assigned. According to an embodiment of the present invention, some groups are preferentially assigned to child tasks based on parent-child relationship, and then remaining groups may be assigned based on quantity relationship of possible value combination. Some groups can be assigned based on quantity relationship of possible value combination, and then remaining groups may be assigned based on parent-child relationship.

Those skilled in the art can appreciate that although some specific embodiments about logic relationship among groups are given above, they aren't any specific limit to "logic relationship". Any relationships that exist among various groups, so long as they can explicitly be used to assign parallel child tasks of grouping set query request in a unit of group, fall into the concept of the present invention and can attain the purpose of the present invention. For example, each group in a grouping set query statement can be simply assigned to a child task (assuming that number of parallel child tasks is exactly equal to number of groups), in this case, "logic relationship" is simple group relationship.

Referring back to FIG. 2, in step 203, the parallel child tasks are executed to generate grouping set query result. If there are no duplications of the assigned groups in respective child tasks (one group exists only in one child task), execution results of each child task are directly combined to form final result of grouping set query. This combining doesn't relate to merging process. According to another embodiment of the present invention, if there is duplication of the assigned groups in a plurality of child tasks, execution results of duplication groups in the plurality of child tasks to which the duplication groups are assigned, are merged, and then execution results of respective child tasks are combined to form final result of grouping set query.

According to one embodiment, groups are executed in a specified preferential order when each child task is performed, and while groups which should be preferentially executed are completed, other groups assigned in each child task are performed. According to another embodiment of the present invention, there is no group which should be preferentially executed in each child task. Contents about preferential execution order of the assigned groups in child tasks will be further described below with reference to FIGS. 3-5.

Figure 3:
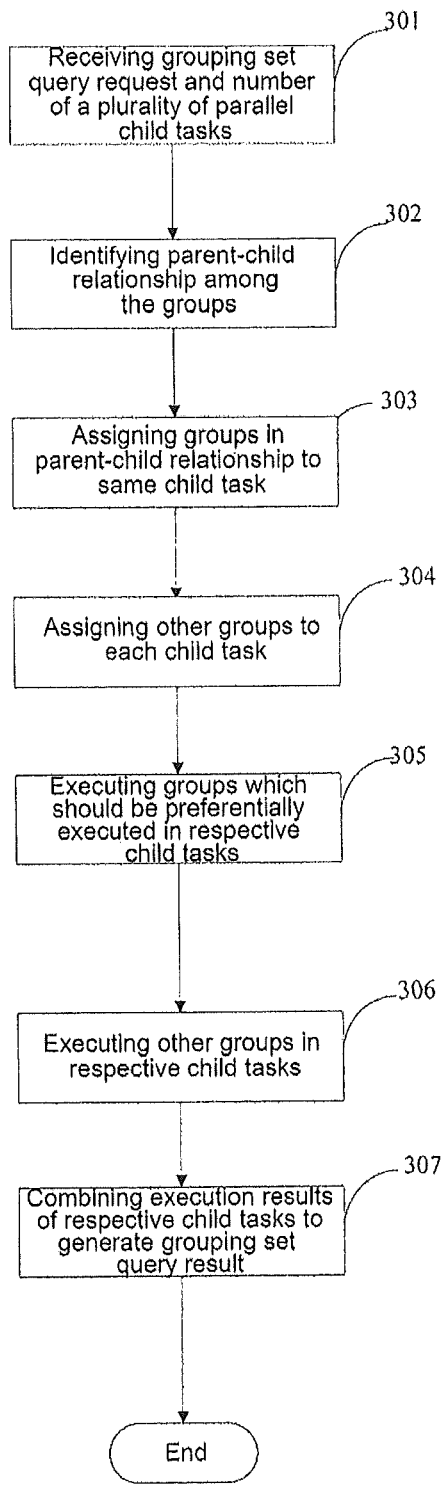
FIG. 3 is a flowchart illustration of a database grouping set query according to an alternate embodiment.

FIG. 3 is a flow chart illustration of a method for database grouping set query according to a different embodiment. Step 301 corresponds to step 201 of FIG. 2 and therefore a similar explanation is omitted for brevity. In step 302, parent-child relationship among the groups is identified. The definition and illustration as to parent-child relationship have been described above. Those skilled in the art should appreciate that, identifying of parent-child relationship among groups contained in grouping set query statement based on SQL statement may be accomplished by using an existing technology.

In step 303, groups which are in special parent-child relationship are assigned to same parallel child task based on number of the parallel child tasks. Still taking Table 1 as an example, assuming that grouping set query statement Grouping Set{(Gender, Age),(No., Gender, Age), (No., Telephone)} is received at step 301 and assuming that number of parallel child tasks received at step 301 is 2, then as described above, group (Gender, Age) and group (No., Gender, Age) which are in parent-child relationship are assigned to child task 1, and group (No., Telephone) is assigned to child task 2. Here, group (Gender, Age) and group (No., Gender, Age) are those which are in special parent-child relationship, and they are both assigned to same parallel child task—child task 1.

It should be noted that although steps 302 and 303 provide different embodiments reflecting cases of assigning child tasks based on parent-child relationship, those skilled in the art should appreciate that, specific implementations of assigning one or more of the groups to at least one of the plurality of parallel child tasks based on logic relationship among the groups and the number of the plurality of parallel child tasks aren't limited thereto, and any specific implementation fall into the concept of the present invention so long as parent-child relationship among groups is considered in assigning child tasks.

In step 304, groups which aren't assigned to some specific parallel child task based on logic relationship among the groups, are assigned to a specific parallel child task, to enable all groups in the grouping set to be included in each of parallel child tasks. In order to better understand step 304, the above example is still used. According to assignment results at step 303, group (Gender, Age) and group (No., Gender, Age) are assigned to child task 1, and group (No., Telephone) is assigned to child task 2. Since there is such possibilities that performing of child task 1 is quickly completed while waiting for child task 2 to end, this results in a certain standby time in thread of child task 1. In order to better utilize all processing resources, after child task 1 completes execution of the assigned groups which are in parent-child relationship, it can help child task 2 to perform part of task if it has capability. That is, group (No., Telephone)—which isn't assigned to specific parallel child task 1 based on logic relationship among the groups—is also assigned to specific child task 1, to enable all groups in grouping set to be included in child task 1. It should be noted that, although all groups are included in child task 1, group (Gender, Age) and group (No., Gender, Age) are preferentially executed, and child task 1 executes group (No., Telephone) only when these two preferential groups which are in parent-child relationship completes execution. Also, group (Gender, Age) and group (No., Gender, Age) may also be assigned to child task 2, and group (Gender, Age) and group (No., Gender, Age) are executed only when child task 2 preferentially completes execution of group (No., Telephone). It should be noted that, those skilled in the art should appreciate that setting of groups which are preferentially executed may be achieved by adding state tags to each child task. For example, initial state tags of child task 1 which correspond to group (Gender, Age) and (No., Gender, Age) are set as "1", and state tag corresponding to group (No., Telephone) is set as "0". "1" represents that there is task, and "0" represents that there is no task. Once child task 1 completes execution of group (Gender, Age) and (No., Gender, Age), the initial state tags of the child task 1 which correspond to group (Gender, Age) and (No., Gender, Age) of "1" will be updated to "0", and state tag corresponding to group (No., Telephone) will be set as "1", such that child task 1 may continue execution of group (No., Telephone). Those skilled in the art can appreciate that, how to set state identification or parameter of preferential level depends on different database products, however, these are all achieved easily since all of current database products allow for setting various parameters to control outputting of query results.

It should be noted that even if child task 1 only contains group (Gender, Age) and (No., Gender, Age) and child task 2 only contains group (No., Telephone), the purpose of the present invention can still be achieved and the technical problem to be solved can be solved, although there may be a case that thread resources of child task 1 or child task 2 haven't been used sufficiently. If step 304 isn't contained after step 303, there isn't problem of preferential execution in each child task. Only if the process of step 304 is to be performed, it is needed to set preferential level of each child task to groups assigned based on logic relationship among groups.

Steps 305-307 correspond to steps 203 of FIG. 2. In step 305, groups which are assigned in respective child tasks and should be preferentially executed are executed. In step 306, other groups which are assigned in respective child tasks are executed in response to completion of the groups which should be preferentially executed. In step 307, results generated from execution of respective child tasks are combined to generate grouping set query result. It should be appreciated that, if step 304 isn't contained, then only at step 305, respective child task is executed (without considering problem of preferential performing groups), thus step 306 can be skipped and step 307 is performed directly to combine results generated from performing of respective child tasks to generate grouping set query result. As mentioned in textual description of step 203, according to another embodiment of the present invention, if there is duplication of groups assigned in a plurality of child tasks (a case that step 304 is contained), execution results of duplication groups in the plurality of child tasks to which the duplication groups are assigned, are merged, and then execution results of respective child task are combined to form final result of grouping set query. Those skilled in the art should appreciate that, although the premise that step 304 is contained is based on, some merging processes are still needed finally at step 203 or 307, however, computation amount of these merging processes are far smaller than that of the merging process of child task division according to conventional prior art.

Figure 4:
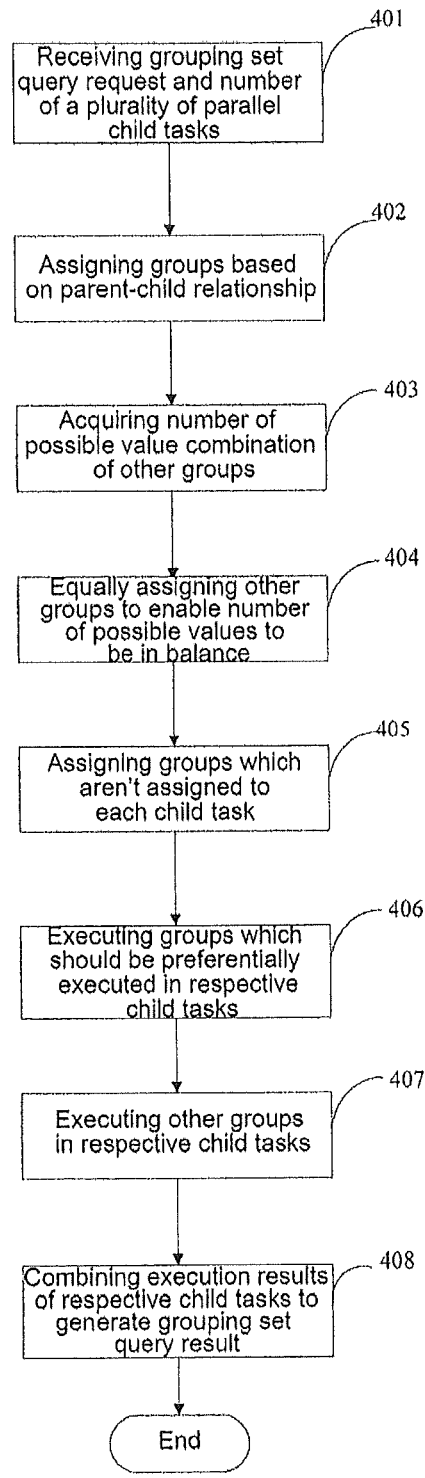
FIG. 4 is a flowchart illustration of a database grouping set query according another alternate embodiment.

FIG. 4 is a flow chart illustration of yet another alternate method for database grouping set query processing. One difference between embodiment illustrated in conjunction with FIG. 3 and that shown in conjunction with FIG. 4 is that two logic relationships—parent-child relationship and quantity relationship of possible value combination of the groups—are concurrently used in FIG. 4. Step 401 corresponds to step 201 in FIG. 2 and step 301 in FIG. 3. In addition, step 402 corresponds to steps 302-303 in FIG. 3. In step 403, however, the methodology conducts the step of acquiring number of possible value combination of other groups. The number of possible value combination can be equal to the number of possible value combination of different data column values contained in specified groups. This is obtained based on history data statistics. It should be noted that, since data might be updated continually, the number of possible value combination which are obtained based on history information may not be entirely accurate (updating of history statistics information is later than updating of actual data) but this is inconsequential.

In step 404, one or more of the other groups are assigned to corresponding parallel child tasks equally based on the number of possible value combination of the other groups and the number of parallel child tasks for processing the grouping set query request, to enable sum of possible values of the assigned other groups in respective parallel child tasks to be in balance. Still taking Table 1 as an example, assuming that grouping set query statement Grouping Set{ (Gender, Age),(No., Gender, Age), (No., Telephone), (Gender, Telephone), (Age, Telephone)} is received at step 401 and assuming that number of parallel child tasks received at step 401 is 2. Firstly, it is identified that group (Gender, Age) and group (No., Gender, Age) are in parent-child relationship, and are assigned to child task 1. Then, it is acquired that, from history statistics information, number of possible value combination of group (No., Telephone) is 3, number of possible value combination of group (Gender, Telephone) is 2, and number of possible value combination of group (Age, Telephone) is also 2. Then, at step 404, group (No., Telephone) is assigned to child task 1, group (Gender, Telephone) and group (Age, Telephone) are assigned to child task 2, thereby enabling sum of possible values of the assigned other groups in two parallel child tasks to be in balance. It can be seen that, if both of group (No., Telephone) and group (Age, Telephone) are assigned to child task 1, child task 1 needs to process two groups assigned based on parent-child relationship as well as the two other groups, however, child task 2 only needs to process group (Gender, Telephone), which results in that, after child task 2 completes, it may need to wait for child task 1 for a long time so as to combine results finally.

In step 404, the assignment results obtained on the basis of parent-child relationship (step 402) may also be considered. For example, if two groups which are in parent-child relationship have been assigned to child task 1, then, at step 404, only group (Age, Telephone) is assigned to child task 1, and group (Gender, Telephone) and (No., Telephone) are both assigned to child task 2. Those skilled in the art should appreciate that, any specific assignment may be performed by setting different rules, so long as quantity relationship of possible value combination of the groups in assignment is considered, thus all of the specific assignments fall into the concept of the present invention.

In one embodiment, groups which are assigned based on parent-child relationship may be set as groups which should be preferentially executed, or groups which are assigned based on parent-child relationship and groups which are assigned based on quantity relationship of possible value combination of the groups are both set as groups which should be preferentially performed, or groups which are assigned based on parent-child relationship and groups which are assigned based on quantity relationship of possible value combination of the groups are set by different preferential executing levels.

In step 405, groups which aren't assigned to some specific parallel child task based on logic relationship (among the groups to the specific parallel child task) are enabled so that all groups in the grouping set are to be included in parallel child task processing. Step 405 can be considered as corresponding to step 304 in FIG. 3 and may be omitted selectively in some embodiments. The logic relationship in this step can include parent-child relationship logic and results as provided in step 402. This can then quantity the relationship and the possible value combination of the groups provided in steps 403-404.

Steps 406-408 correspond to steps 305-307 of FIG. 3, and step 203 of FIG. 2. In embodiments where step 405 is omitted, the respective child tasks of step 406 may be simply performed. While there is no problem of preferential execution, there is a possibility that respective child tasks may execute various groups according to preferential level order. This is because different preferential levels may be set for groups assigned in step 402 and groups assigned in step 404. In such a case, the groups in child task need to execute the operations in sequence according to these preferential levels.

It should be noted that, in embodiment as shown in FIG. 4, the given examples of logic relationship are "parent-child relationship" and "quantity relationship of possible value combination of the groups". Those skilled in the art should appreciate that, groups may be assigned at many or single hierarchy based on other various logic relationships, for example, assignment may be performed based on number of data columns contained in groups.

Figure 5:
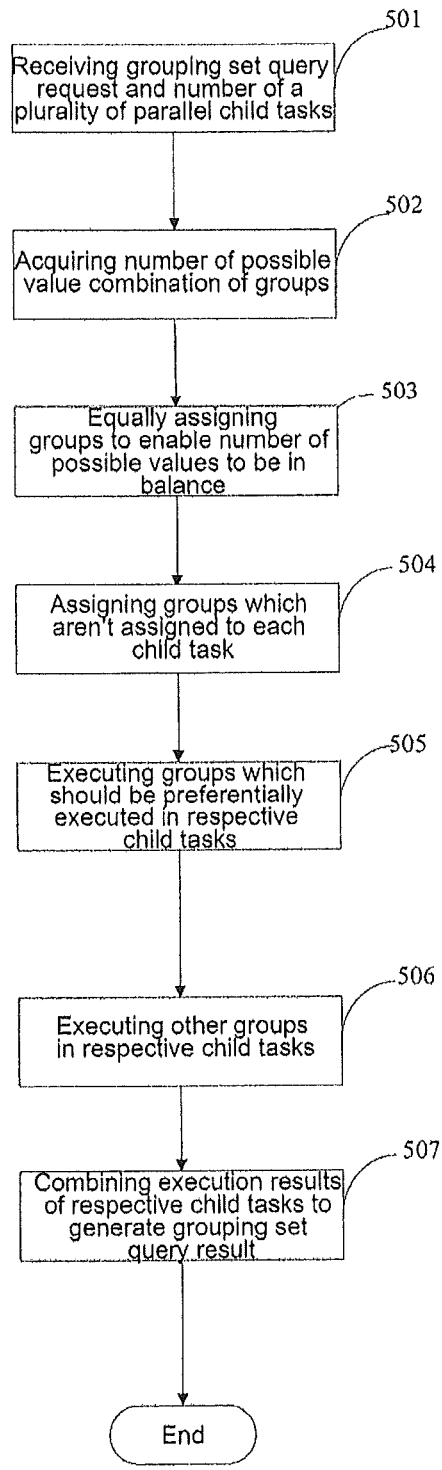
FIG. 5 is a flowchart illustration of a database grouping set query according to yet another alternate embodiment.

FIG. 5 is a flow chart illustration of yet another alternative embodiment describing another method for database grouping set queries. Embodiment discussed in conjunction with FIG. 5 differs from that discussed in FIGS. 3 and 4 in that, in the embodiment of FIG. 5, the logic relationship among groups (as number of possible value combination of groups) is only considered. Step 501 corresponds to step 401 in FIG. 4, step 301 in FIG. 3 and step 201 in FIG. 2, and steps 502-507 may be considered as corresponding to steps 402-408 in FIG. 4 respectively. One difference in FIG. 5 can be appreciated in looking at steps 502-507. Steps 402-408 of FIG. 4 are performed after assignments are made based on a parent-child logic relationship. In contrast, steps 502-507 of FIG. 5 are directly performed after grouping set query request are determined and number of parallel child tasks is received.

It should be noted that, in embodiments discussed in conjunction with FIGS. 2, 3, 4, 5, independent of which (one or more) logic relationships are used in assignment of groups, the parent-child relationship among these groups can still be used in a manner that improves process efficiency within each parallel child task performance. For example, even if in assignment of groups to each child task, the parent-child relationship isn't used, the quantity relationship of possible value combination of the groups is used. In addition group (Gender, Age) and group (No., Gender, Age) are exactly assigned to each child task separately to complete the group (Gender, Age). The execution result of group (Gender, Age) may still be used in execution of group (No., Gender, Age) directly and without scanning all data records again, which impacts and improve efficiency of data query as a whole.

Figure 6:
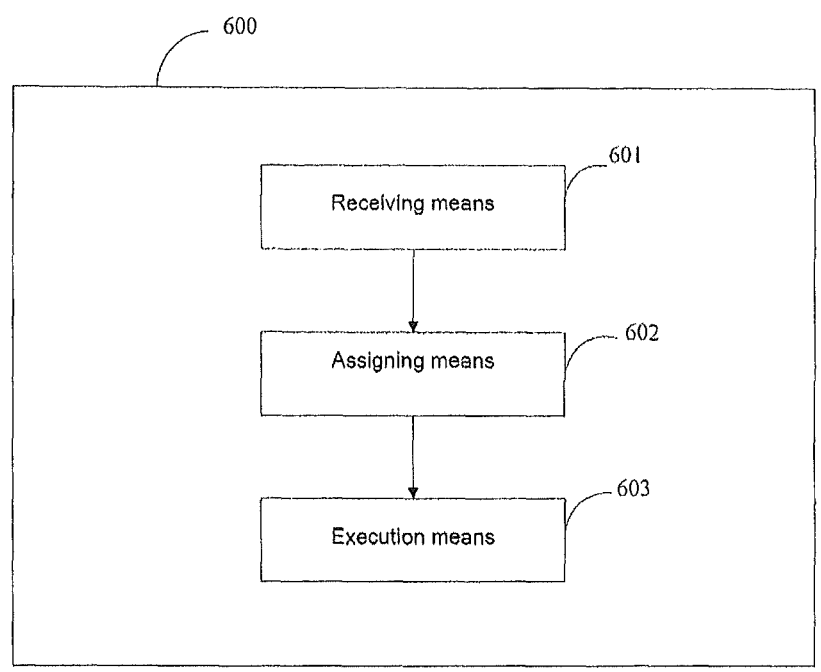
FIG. 6 depicts a block diagram for a system using the database grouping set query technique according to one embodiment.

FIG. 6 depicts a block diagram of a system used for database grouping set queries as per one embodiment. The system 600 can include receiving means 601 configured to receive grouping set query requests for a plurality of parallel child tasks (for processing the grouping set query request). It also contains the grouping set containing groups. In addition assigning means 602 configured to assign one or more of the groups to at least one of the plurality of parallel child tasks based on logic relationship among the groups and the number of the plurality of parallel child tasks is provided. An execution means 603 is also provided and configured to execute the parallel child tasks to generate grouping set query result. Means 601-603 in system 600 correspond to 201-203 in FIG. 2 respectively.

The flowchart and block diagrams in the above mentioned figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a database grouping set query, the method comprising:
    receiving a grouping set query request, wherein the grouping set query request includes a plurality of groups, each group in the plurality of groups executable independently of each other group in the plurality of groups;
    determining, via the grouping set query request, a number of available parallel child tasks for parallel processing the grouping set query request;
    assigning a first group of the plurality of groups to one of the available parallel child tasks and a second group of other groups of the plurality of groups to another of the available parallel child tasks, wherein the assigning of the first group of the plurality of groups is based at least on both (a) a parent-child logical relationship that is already in existence between two or more groups of the plurality of groups and on (b) the number of available parallel child tasks but not on data amount, wherein assigning of the second group of the other groups is based at least on the number of possible value combinations of the other groups and on the number of available parallel child tasks but not on data amount, wherein groups which are in a logical relationship between each other are preferentially assigned to the same parallel child task, wherein the other groups of the plurality of groups does not include the first group; and
    executing the parallel processing of the child tasks in order to generate a grouping set query result, wherein each of the parallel child tasks executes an assigned group with respect to all data records of the database;
    wherein generating the grouping set query result includes:
        upon determining that there are no duplications of assigned groups in respective child tasks, directly combining execution results of each child task to form the grouping set query result; and
        upon determining that there is a duplication of assigned groups in a plurality of child tasks, merging execution results of duplication groups in the plurality of child tasks to which the duplication groups are assigned, and combining execution results of respective child tasks to form the grouping set query result;
    wherein the assigning further includes:
        acquiring a number of possible value combinations of each of the plurality of groups; and
        assigning one or more of the plurality of groups to corresponding parallel child tasks based at least on the number of possible value combinations of each of the plurality of groups by, at least balancing the number of possible value combinations across the parallel child tasks.

2. The method according to claim 1, wherein the logical relationship comprises quantity relationships of possible value combinations of the plurality of groups.

3. The method according to claim 1, wherein the executing the parallel processing of the child tasks in order to generate a grouping set query result further comprises:
    identifying a parent-child relationship among the plurality of groups which are assigned in the parallel child tasks; and
    using execution results of child groups in groups which are in the parent-child relationships to execute parent groups corresponding to the child groups.

4. The method according to claim 1, wherein the logical relationship comprises a parent-child relationship among the plurality of groups.

5. The method according to claim 4, wherein the assigning of the first group further includes:
    identifying the parent-child relationships among the plurality of groups; and
    assigning groups which are in specific parent-child relationships between each other to a same parallel child task based on the number of available parallel child tasks.

6. A system for processing a database grouping set query, the system comprising a memory having computer readable instructions and one or more processors for executing the computer readable instructions, the computer readable instructions comprising:
    receiving a grouping set query request, wherein the grouping set query request includes a plurality of groups, each group in the plurality of groups executable independently of each other group in the plurality of groups;
    determining, via the grouping set query request, a number of available parallel child tasks for parallel processing the grouping set query request;
    assigning a first group of the plurality of groups to one of the available parallel child tasks and a second group of other groups of the plurality of groups to another of the available parallel child tasks, wherein the assigning of the first group of the plurality of groups is based at least on both (a) a parent-child logical relationship that is already in existence between two or more groups of the plurality of groups and on (b) the number of available parallel child tasks but not on data amount, wherein assigning of the second group of the other groups is based at least on the number of possible value combinations of the other groups and on the number of available parallel child tasks but not on data amount, wherein groups which are in a logical relationship between each other are preferentially assigned to the same parallel child task, wherein the other groups of the plurality of groups does not include the first group; and
    executing the parallel processing of the child tasks in order to generate a grouping set query result, wherein each of the parallel child tasks executes an assigned group with respect to all data records of the database;
    wherein generating the grouping set query result includes:
        upon determining that there are no duplications of assigned groups in respective child tasks, directly combining execution results of each child task to form the grouping set query result; and
        upon determining that there is a duplication of assigned groups in a plurality of child tasks, merging execution results of duplication groups in the plurality of child tasks to which the duplication groups are assigned, and combining execution results of respective child tasks to form the grouping set query result:
wherein the assigning further includes:
acquiring a number of possible value combinations of each of the plurality of groups; and
assigning one or more of the plurality of groups to corresponding parallel child tasks based at least on the number of possible value combinations of each of the plurality of groups by at least balancing the number of possible value combinations across the parallel child tasks.

7. The system according to claim 6, wherein the logical relationship comprises quantity relationships of possible value combinations of the plurality of groups.

8. The system according to claim 6, wherein the executing the parallel processing of child tasks in order to generate a grouping set query result further comprises:
identifying a parent-child relationship among the plurality of groups which are assigned in the parallel child tasks; and
using execution results of child groups in groups which are in the parent-child relationships to execute parent groups corresponding to the child groups.

9. The system of claim 6, wherein the logical relationship comprises a parent-child relationship among the plurality of groups.

10. The system according to claim 9, wherein the assigning of the first group further includes:
identifying the parent-child relationships among the plurality of groups; and
assigning groups which are in specific parent-child relationships between each other to a same parallel child task based on the number of available parallel child tasks.

11. A computer program product for processing a database grouping set query, the computer program product comprising a non-transitory computer readable storage medium having program instructions embodied therewith, the program instructions executable by a processor to cause the processor to perform:
receiving a grouping set query request, wherein the grouping set query request includes a plurality of groups, each group in the plurality of groups executable independently of each other group in the plurality of groups;
determining, via the grouping set query request, a number of available parallel child tasks for parallel processing the grouping set query request;
assigning a first group of the plurality of groups to one of the available parallel child tasks and a second group of other groups of the plurality of groups to another of the available parallel child tasks, wherein the assigning of the first group of the plurality of groups is based at least on both (a) a parent-child logical relationship that is already in existence between two or more groups of the plurality of groups and on (b) the number of available parallel child tasks but not on data amount, wherein assigning of the second group of the other groups is based at least on the number of possible value combinations of the other groups and on the number of available parallel child tasks but not on data amount, wherein groups which are in a logical relationship between each other are preferentially assigned to the same parallel child task, wherein the other groups of the plurality of groups does not include the first group; and
executing the parallel processing of the child tasks in order to generate a grouping set query result, wherein each of the parallel child tasks executes an assigned group with respect to all data records of the database;
wherein generating the grouping set query result includes:
upon determining that there are no duplications of assigned groups in respective child tasks, directly combining execution results of each child task to form the grouping set query result; and
upon determining that there is a duplication of assigned groups in a plurality of child tasks, merging execution results of duplication groups in the plurality of child tasks to which the duplication groups are assigned, and combining execution results of respective child tasks to form the grouping set query result;
wherein the assigning further includes:
acquiring a number of possible value combinations of each of the plurality of groups; and
assigning one or more of the plurality of groups to corresponding parallel child tasks based at least on the number of possible value combinations of each of the plurality of groups by at least balancing the number of possible value combinations across the parallel child tasks.

12. The computer program product of claim 11, wherein the logical relationship comprises quantity relationships of possible value combinations of the plurality of groups.

13. The computer program product of claim 11, wherein the logical relationship comprises a parent-child relationship among the plurality of groups.

* * * * *